United States Patent

Hedman

[15] 3,691,412
[45] Sept. 12, 1972

[54] SUBSTANTIALLY RIPPLE-FREE FAST-RESPONSE VOLTAGE REGULATED DIRECT-CURRENT POWER SUPPLY

[72] Inventor: Theodore A. Hedman, Davenport, Iowa

[73] Assignee: Gulf & Western Industries, Inc., New York, N.Y.

[22] Filed: May 13, 1971

[21] Appl. No.: 142,973

[52] U.S. Cl. .................... 321/18, 321/2, 321/46, 331/112
[51] Int. Cl. .................... H02m 7/20, H01m 3/32
[58] Field of Search .............. 321/2, 16, 18, 45 R, 46; 331/113 R, 113 S, 112

[56] References Cited

UNITED STATES PATENTS

| | | | |
|---|---|---|---|
| 3,408,553 | 10/1968 | Bishop | 321/16 |
| 3,573,596 | 4/1971 | Kamil et al. | 321/2 |
| 3,373,334 | 3/1968 | Geisz et al. | 321/2 |
| 3,383,582 | 5/1968 | Bishop et al. | 321/45 R |
| 3,546,626 | 12/1970 | McGhee | 331/113 R |
| 3,584,289 | 6/1971 | Bishop et al. | 321/18 |
| 3,562,688 | 2/1971 | Kussy et al. | 337/336 X |

*Primary Examiner*—Gerald Goldberg
*Attorney*—Meyer, Tilberry and Body

[57] ABSTRACT

An alternating-current to direct-current power converter is provided in which alternating-current input is rectified to direct-current and the direct-current voltage is chopped into high frequency alternating current by a free-running, current-limited blocking oscillator. A delay network is provided for squelching high voltage spikes which would otherwise be induced by rate of change of current in transformer inductance. A clamp circuit is provided for holding transformer-generated energy, which is periodically released according to the demands of the power supply. High clamp clamping current-resistance losses are thus avoided.

11 Claims, 3 Drawing Figures

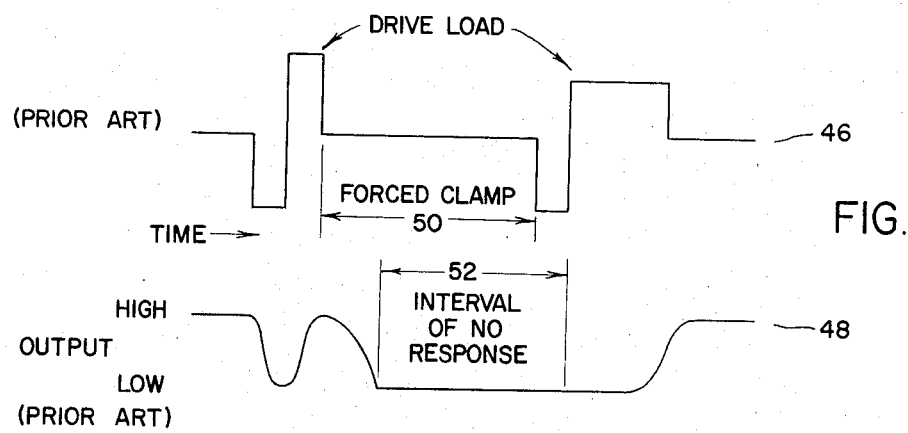
FIG. 1
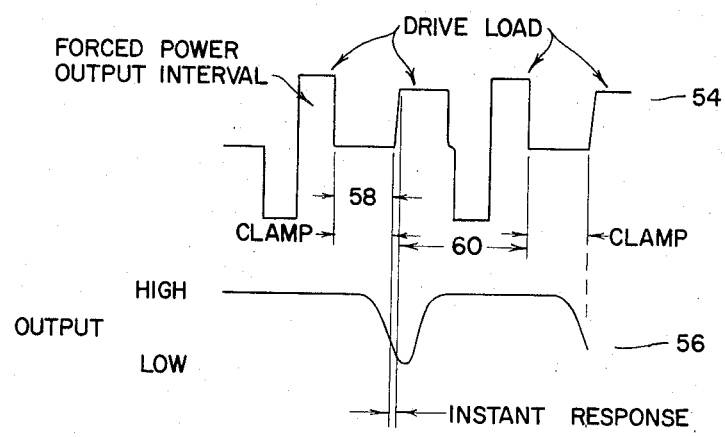
FIG. 2
FIG. 4
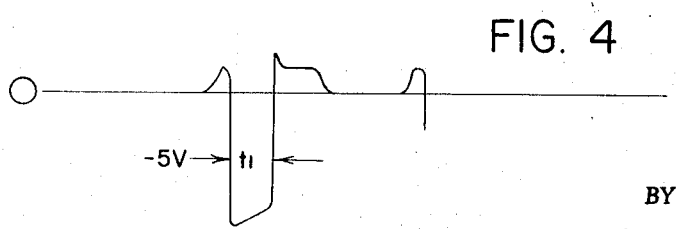
INVENTOR.
THEODORE A. HEDMAN
BY
Meyer, Tilberry & Body
ATTORNEYS INVENTOR.
THEODORE A. HEDMAN
BY
Meyer, Tilberry, & Body
ATTORNEYS

SUBSTANTIALLY RIPPLE-FREE FAST-RESPONSE VOLTAGE REGULATED DIRECT-CURRENT POWER SUPPLY

The sequence of operation is such that the clamp interval is interrupted by demands of the power supply load. A forced power input interval is provided to avoid high clamp-current $I^2R$ losses. Both alternating-current and direct-current regulators are provided. The alternating-current regulator controls the power supply by sensing signals which are synchronized with the sequence and signals from the direct-current regulator. The direct-current regulator senses the direct-current level on the output load terminals.

Alternating-current to direct-current converters have been proposed which operated in a switching-mode sequence. A regulator was provided which sensed the output voltage ripple rather than the output direct-current voltage level so as to put a requirement of ripple voltage on the direct-current output which should be ripple-free. In such regulators, the output voltage ripple sensed by the regulator is out of phase with the switching of the power supply and adds more ripple voltages to the output.

In a switching sequence of such converters, there is a forced interval in the operation sequence where the converter is forced to wait until the end of the clamp interval before it can supply energy to the load. This means the power supply cannot respond immediately to changes in load.

In some prior art devices as described, for example, in U.S. Pat. No. 3,562,668, patented Feb. 9, 1971, a normally clamped oscillator operates as a high-frequency switching circuit and is controlled by an oscillator control circuit. The operating frequency of the oscillator is controlled so as to provide a direct-current output level which is maintained at a predetermined level. Under a clamped condition, usually at no load, the frequency required to give this level is the lower operating frequency limit. A comparison circuit continuously compares the direct-current output voltage with a predetermined level set by a reference setting circuit. Should the direct-current output voltage start to fall below the predetermined level, a voltage signal is produced by the comparison circuit. This voltage signal is directed to the oscillator control circuit to unclamp the oscillator to oscillate at a frequency necessary to restore the output voltage to a predetermined voltage level.

In accordance with the present invention, a tuned variable frequency power supply is provided in which the drive load occupies the greater part of the cycle of the variable frequency power supply. The oscillator is prevented from delivering power during clamp intervals and delivers power during drive load intervals. There is an instant response at the termination of each clamp interval.

In accordance with one embodiment of the invention, an alternating-current to direct-current converter is provided with input terminals for receiving alternating current at a power frequency such as received from the central station, there is an oscillator of the blocking oscillator type and a rectifier is interposed between the alternating-current input terminals and the energy receiving input terminals of the oscillator. The oscillator has circuit constants chosen to produce a free-running frequency considerably higher than the frequency at the alternating-current input terminals. Rectifying and filtering means are provided for converting energy received from the oscillator to smooth direct current at direct-current output terminals. There are both direct-current and alternating-current regulators. The direct-current regulator has an input from the direct-current output terminals and an output forming an adjustable reference voltage means. The alternating-current regulator has an input from the adjustable reference voltage means and an input from the unfiltered output of the rectified energy from the oscillator with an output to a clamping circuit. The clamping circuit is connected in the oscillator circuit for suppressing energy during clamping periods when the alternating-current regulator receives a lower voltage from the rectified, but unfiltered, output of the oscillator than from the adjustable reference voltage means.

A better understanding of the invention will be afforded by the following detailed description considered in conjunction with the accompanying drawings in which:

FIG. 1 is a graph illustrative of the operation of prior art variable frequency power supplies;

FIG. 2 is a graph illustrating the operation of the power supply in accordance with the invention;

FIG. 4 is a graph illustrating the shape of the output wave form of the blocking oscillator at the output winding of a pulse transformer.

Like reference characters are utilized throughout the drawings to designate like parts.

Figure 3:
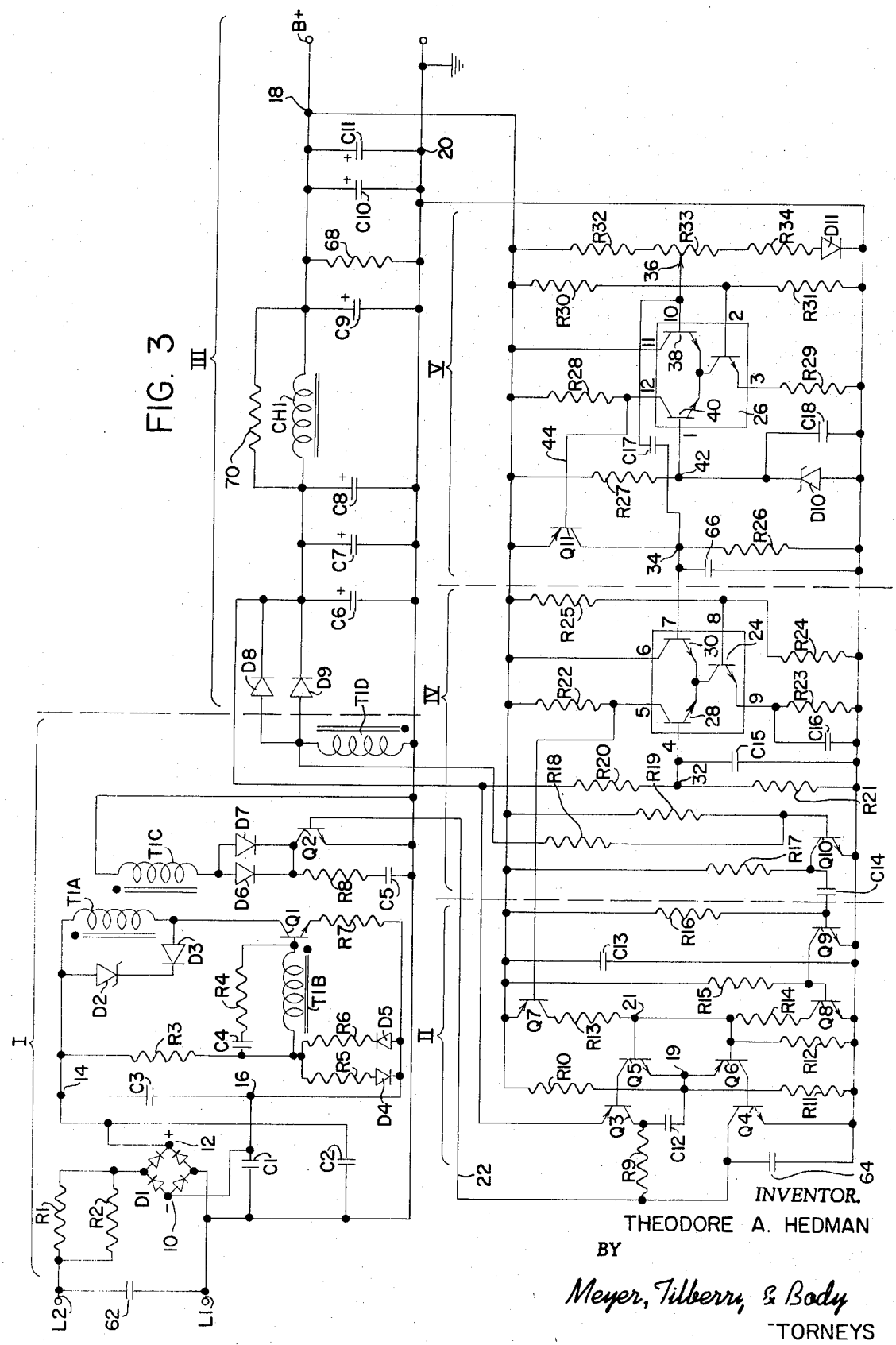
FIG. 3 is an overall circuit diagram of the apparatus.

An object of the invention is to provide a direct-current power supply, or alternating-current to direct-current converter of relatively high efficiency without destructive internal voltage transients, with quick response and relatively little ripple voltage on the direct-current output.

A further object of the invention is to provide an improved switching sequence in a variable frequency type of alternating-current to direct-current converter.

Still another object of the invention is to regulate output by sensing the direct-current voltage level rather than sensing output voltage ripple.

A further object of the invention is to avoid regulating output by sensing an output voltage ripple which is out of phase with the switching of the power supply.

Still another object of the invention is to accomplish fast turn-off times without introducing voltage spikes of excessive value due to voltage induced by abrupt change of current in inductance.

Other and further objects, advantages and features of the invention will become apparent as the description proceeds.

DETAILED DESCRIPTION

Energy Converter

As shown in the drawings, the energy converter 1 comprises a full-wave diode rectifier D1 connected to alternating-current input terminals L1 and L2 through parallel-connected resistors R1 and R2 with a capacitor C1 connected between the terminal L1 and the negative output terminal 10 of the rectifier D1, a capacitor C2 connected between the terminal L1 and the positive output terminal 12 of the rectifier D1 and a capacitor C3 connected between the rectifier output terminals 10 and 12.

For chopping the direct-current voltage appearing at the terminals 14 and 16 of the capacitor C3 into high frequency alternating current, a free-running current-limited blocking oscillator circuit is provided. The blocking oscillator circuit comprises a pulse transformer T1 with windings T1A, T1B, T1C and T1D, resistors R3, R5, R6 and R7, diodes D4 and D5 and a transistor Q1, shown as NPN. The winding T1A is the primary winding of the transformer and is connected in series with the transistor Q1. The winding T1B is a feedback winding coupled at one end to the base of the transistor Q1, and coupled at its opposite end to the primary winding T1A through the resistor R3. As indicated by the polarity marks in the drawing, the end of the transformer winding T1A connected to the resistor R3 is of the same polarity as the end of the feedback winding T1B connected to the base of the transistor Q1.

A delay network is provided comprising a capacitor C4 and a resistor R4 connected in series across the feedback winding T1B to prevent the transistor Q1 from turning off too fast. Accordingly, high voltage spikes on the transistor Q1 induced in the inductance of the primary winding T1 are squelched. The capacitors C1 and C2 serve to filter switching noise to the input lines. A zener diode D2 and a diode D3 are connected with polarities as shown in series across the primary winding T1A of the blocking oscillator transformer to limit the amplitude of voltage spikes on the winding T1A. As in conventional blocking oscillator circuits, when the transistor Q1 becomes conducting it loads energy into the transformer T1 and then turns off. The transistor Q1 will not turn on again until the energy loaded into the transformer T1 is depleted.

Clamp Circuit

A second transistor, also shown as being of the NPN type, is connected across the pulse transformer tertiary winding T1C in series with a shunted pair of diodes D6 and D7 to form a circuit which holds the energy generated in the transformer T1. A resistor R8 and a capacitor C5 are connected in series between the collector and the emitter of the transistor Q2 to form a filter which keeps switching noise out of the regulated output. As will be described in more detail hereinafter, the base of the transistor Q2 is connected to a clamping control circuit II–IV. When the transistor Q2 becomes conducting, it forms a short circuit across the winding T1C which allows current to flow freely through the winding T1A and clamps the energy in the transformer T1. On the other hand, when the transistor Q2 turns off, the energy is forced into the load circuit through a fourth winding T1D. The transistor Q2 is controlled by the regulator circuit II–IV.

A load circuit is connected to direct-current output terminals 18 and 20, which are connected to the pulse transformer winding T1D through rectifiers shown as a pair of parallel-connected rectifiers D8 and D9, the parallel pair being in series with a filter inductance CH1. In the circuit illustrated, a pi type of filter connection is employed with parallel capacitors C6, C7 and C8 across the direct-current line ahead of the filter inductor CH1 and parallel-connected capacitors C9, C10 and C11 across the direct-current output terminals 18 and 20.

Alternating-Current Regulator

There is an alternating-current regulator having a driver stage II including transistors Q3, Q4, Q5 and Q6 for driving the transistor Q2 of the energy converter. The transistors Q3 and Q6 are shown as PNP transistors and the transistors Q4 and Q5 as NPN transistors. The driver stage also includes resistors R9, R10, R11, R12, R13 and R14 and capacitors C12 and C13. The resistors R10 and R11 are connected in series across the direct-current output windings 18 and 20 and have a junction terminal 19 connected to the emitters of the transistors Q5 and Q6. The collectors of the transistors Q3 and Q4 are connected through the resistor R9, and the collector of the transistor Q4 is coupled to the base of the transistor Q2 by direct connection through a conductor 22.

For driving the driver stage of the alternating-current regulator, a transistor Q7, shown as a PNP transistor, is provided which is responsive to output load conditions and it is in turn, driven by a differential amplifier circuit IV. The differential amplifier circuit includes one half 24 of an integrated circuit including elements 24 and 26, shown separately in the drawing. The differential amplifier circuit also includes resistors R22, R23, R24 and R25 and capacitors C15 and C16. The arrangement is such that the differential amplifier compares the signal on pin 4, the connection to the base of a transistor 28 with that on pin 7 connected to the base of a transistor 30, both included in the integrated circuit element 24. A voltage divider consisting of resistors R20 and R21 is connected across the capacitors C6, C7 and C8 of the direct-current output filter circuit III. The junction terminal 32 of the resistors R20 and R21 is connected to the pin 4 of the integrated circuit element 24 so that the signal on pin 4 is essentially the unfiltered ripple at the cathode of the rectifier D9 reduced in value by the voltage division of the voltage divider R20–R21. On the other hand, the signal on pin 7 of the integrated circuit element 24 is a direct-current analog voltage relative to the demand of the load. Consequently, the transistor Q7 is driven in phase with the signals generated by the power supply as it drives the load.

For providing a direct-current analog voltage relative to the demand of the load, a transistor Q11 shown as a PNP transistor and a resistor R26 are connected in series between the direct-current output terminals 18 and 20, and the collector terminal 34 of the transistor Q11 is connected to the pin 7 of the integrated circuit element 24.

A triggered-delay network is provided which is triggered when the transistor Q1 starts to conduct and loads energy into the transformer T1. The triggered-delay network comprises a resistor R14 and an NPN transistor Q8 connected in series between the ground terminal 20 of the direct-current power supply and the collector resistor R13 of the transistor Q7. The junction terminal 21 of the resistors R13 and R14 is connected to the bases of the transistors Q5 and Q6. The triggered-delay network also includes resistors R17, R18 and R19, capacitor C14 and an NPN transistor Q10. The base of the transistor Q8 is resistance-coupled to the collector of the NPN transistor Q9 and the base of the transistor Q9 is resistance-capacitive coupled to the collector of the transistor Q10.

The trigger circuit turns on the transistor Q8 and holds it on until the end of a delay determined by the electrical constants of the timing capacitor C14 and a resistor R16, the junction terminal of which is connected to the base of the transistor Q9. During the time that the transistor Q8 is turned on, it shorts out any signal generated by the transistor Q7 and forces the transistor Q2 to be unclamped. This forces a portion of the energy stored in the transformer T1 to be delivered to the load during every cycle of the power supply and fixes a sequence the power supply must follow. There are no circuits to hold or force the power supply to clamp the output so it may respond instantly to load changes.

Direct-Current Regulator

A direct-current regulator V is provided comprising a transistor circuit consisting of the other half 26 of the integrated circuit including the elements 24 and 26. The direct-current regulator also includes resistors R27, R28, R29, R30, R31, R32, R33, R34, a zener diode D10, a diode D11, a coupling capacitor C17 and a capacitor C18 bridging the zener diode D10. The resistors R32, R33 and R34 connected in series with the diode D11 across the direct-current output terminals 18 and 20, serve as a voltage divider with an adjustable tap 36 on the resistor R33 connected to the pin 10 of the integrated circuit element 26 which is connected to the base of a transistor 38. The integrated circuit element 26 also includes a transistor 40 having a base connected to the pin 1 which is connected to the junction terminal 42 of the resistor R27 and the zener diode D10. The resistor R27 and the zener diode D10 are connected in series across the direct-current output terminals 18 and 20.

Accordingly, the direct-current regulator monitors a predetermined fraction of the output voltage appearing at the pin 10 at the base of the transistor 38. A reference voltage is generated by the resistor R27 and the zener diode D10; the output of the differential amplifier of the direct-current regulator is applied to the base of the transistor Q11 from the pin 12 of the integrated circuit element 26 through a conductor 44. The differential amplifier 26 thus drives the transistor Q11 which develops a voltage on the resistor R26, which the alternating-current regulator senses at the pin 7 of the integrated circuit element 24. A capacitor C17 is connected between the base of the transistor 38 of the integrated circuit element 26 and the junction terminal 34, connected to the base of the transistor 30 in the integrated circuit element 24, to provide feedback for stability.

Owing to the fact that the direct-current regulator senses the direct-current output level, the divider consisting of the elements R32, R33, R34 and D11 may be connected remotely for remote sensing of output voltage. In this manner, the effect of line drop on direct-current voltage at the load is avoided in the cases where the load and the alternating-current to direct-current converter must be placed some distance apart.

If desired, a capacitor 62 may be connected between the alternating-current input terminals L1 and L2. A capacitor 64 may be connected across the transistor Q4 and a capacitor 66 may be connected across the resistor R26. Likewise, one or more resistors 68 may be connected in the shunt branch of the filter unit III and a resistor 70 may be connected in the series branch in parallel with the inductance CH1.

The negative pulse width appearing at the anode of the diode D9 at the output winding T1D of the pulse transformer T1 is adjusted by the selection of the value of the resistor R6. Satisfactory operation is obtained when the pulse width $t_1$ as shown in FIG. 4 is 10.0 + or −0.5 microseconds. The adjustment is made with a line voltage of 120 volts with a load of 2½ amperes at 3.6 volts between the direct-current output terminals 18 and 19. For this purpose the value of resistance of the resistor R6 will be found to be between 15 ohms and 470 ohms.

Operation

The operation of prior-art switching mode sequence regulators is illustrated in FIG. 1 of the drawings which is a graph of output voltage plotted against time.

Curve 46 of FIG. 1 is a graph of an oscillator output voltage plotted against time and curve 48 is a graph of a direct-current output voltage plotted against time. During the period 50, the oscillator is forcibly clamped so that there is an interval of no response 52 illustrated in curve 48 of FIG. 1.

The arrangement described in the present application is a tuned variable frequency power supply in which the drive load voltage is represented by curve 54 and the direct-current output voltage by curve 56 of FIG. 2. The oscillator is prevented from delivering power during clamp intervals 58 and delivers power during drive load intervals 60. However, as shown in FIG. 2, curve 56, there is an instant response when the clamp interval 58 terminates. The power frequency of the input to terminals L1 and L2 may be 60 Hz, e.g., whereas the free-running frequency of the blocking oscillator is of the order of ten to 30 kHz.

The invention is not limited to the use of particular electric values for circuit components. However, satisfactory results have been obtained where the values were as follows:

RESISTORS

| | |
|---|---|
| R1 10 ohms, 1 watt | R18 18 kilohms, ¼ watt |
| R2 10 ohms, 1 watt | R19 5.1 kilohms, ¼ watt |
| R3 100 kilohms, ¼ watt | R20 820 ohms, ¼ watt |
| R4 15 ohms, ½ watt | R21 1.5 kilohms, ¼ watt |
| R5 10 ohms, ½ watt | R22 680 ohms, ¼ watt |
| R6 between 5 ohms and 470 ohms, according to desired negative pulse width $t_1$, ½ watt | R23 470 ohms, ¼ watt |
| | R24 1 kilohm, ¼ watt |
| R7 10 ohms, 10 watts | R25 1 kilohm, ¼ watt |
| R8 220 ohms, 2 watts | R26 470 ohms, ¼ watt |
| R9 10 ohms, 1 watt | R27 330 ohms, ¼ watt |
| R10 47 ohms, ¼ watt | R28 4.7 kilohms, ¼ watt |
| R11 47 ohms, ¼ watt | R29 470 ohms, ¼ watt |
| R12 470 ohms, ¼ watt | R30 1 kilohm, ¼ watt |
| R13 180 ohms, ¼ watt | R31 1 kilohm, ¼ watt |
| R14 10 ohms, ¼ watt | R32 330 ohms, ¼ watt |
| R15 470 ohms, ¼ watt | R33 100 ohms, ¼ watt |
| R16 820 ohms, ¼ watt | R34 330 ohms, ¼ watt |
| R17 390 ohms, ¼ watt | |

CAPACITORS

| | |
|---|---|
| C1 | .005 microfarads, 1000 volts |
| C2 | .1 microfarads, 500 volts |
| C3 | 200 microfarads, 250 volts |
| C4 | .022 microfarads, 100 volts |
| C5 | .01 microfarads, 500 volts |
| C6 | 330 microfarads, 6 volts |
| C7 | 330 microfarads, 6 volts |
| C8 | 330 microfarads, 6 volts |
| C9 | 330 microfarads, 6 volts |
| C10 | 330 microfarads, 6 volts |
| C11 | 22 microfarads, 6 volts |
| C12 | .27 microfarads, 80 volts |
| C13 | 22 microfarads, 6 volts |
| C14 | .1 microfarads, 80 volts |
| C15 | .022 microfarads |
| C16 | 2.2 microfarads, 35 volts |
| C17 | 10 microfarads, 10 volts |
| C18 | 10 microfarads, 10 volts |

DIODES

| | | | |
|---|---|---|---|
| D1 | PGR-92 | D7 | PGR-72 |
| D2 | PGR-129 | D8 | PGR-117 |
| D3 | PGR-72 | D9 | PGR-117 |
| D4 | PGR-68 | D10 | PGR-105 |
| D5 | PGR-68 | D11 | PGR-68 |
| D6 | PGR-72 | | |

TRANSISTORS

| | | | |
|---|---|---|---|
| Q1 | 95SE115 | Q7 | 2N3638 |
| Q2 | SES628 | Q8 | 2N3567 |
| Q3 | 2N3638 | Q9 | 2N3567 |
| Q4 | 2N3567 | Q10 | 2N3567 |
| Q5 | 2N3567 | Q11 | 2N3638 |
| Q6 | 2N3638 | | |
| Integrated Circuit 24,26 | | CA3026 | |

The supply of current to the load at the direct-current output terminals 18 and 20 is adjusted according to needs of the load by clamping and unclamping the energy converter I. As variations in output voltage take place, these are reflected by variations in potential at the terminal 36 of the potentiometer resistor R33 which compares the voltage with the differential amplifier input voltage fixed by the zener diode D10. The output of the differential amplifier in the direct-current regulator V adjusts the reference voltage at the terminal 34 for the differential amplifier IV for the alternating-current regulator driver stage II. Since the non-inverting input for the differential amplifier IV of the alternating-current regulator II is received from the diode D8 connected to the output transformer winding T1D, the variations in alternating-current result in variations in output of the alternating-current regulator, which controls the transistor Q7 of the clamping regulator II so as to clamp the blocking oscillator of the power converter I as the alternating current exceeds the reference value and unclamp the oscillator as the alternating-current voltage falls below the reference value.

Because many modifications may be made in the arrangement described and many widely different embodiments of this invention may be made without departing from the scope and spirit thereof, it is intended that all matter contained in the above description and shown in the accompanying drawings shall be interpreted as illustrative and not in a limiting sense.

What is claimed is:

1. A direct-current power supply comprising in combination:

energy input terminals for receiving alternating current of a predetermined frequency, an oscillator coupled to said terminals, said oscillator having a frequency of oscillation substantially higher than the predetermined frequency of the alternating current supplied to said energy input terminals, rectifying means receiving energy from the oscillator and having direct-current output terminals, a direct-current regulator having an input from the direct-current output terminals and an output forming adjustable reference voltage means, an alternating-current regulator having an input from the adjustable reference voltage means and an output, a clamping circuit having an input from the output of the alternating-current regulator and an output connected to the oscillator for permitting the oscillator to supply energy to the direct-current output terminals through the rectifying means when the input to the alternating-current regulator falls below the value supplied by the adjustable reference voltage means and suppressing the output of the oscillator when the input to the alternating-current regulator rises above the value furnished by the adjustable reference voltage means, whereby demands of the power supply load interrupt the clamp interval to provide a forced power input interval and avoid high clamping current-resistance losses.

2. A direct-current power supply as described in claim 1 wherein the oscillator is blocking oscillator comprising a pulse transformer having an output winding coupled to the rectifying means.

3. A direct-current power supply comprising in combination:

an oscillator having means for storing energy, rectifying means receiving energy from the oscillation and having direct-current a regulator having an input from the direct-current output terminals and an output responsive to direct-current voltage level, a clamping circuit having an input from the output of the regulator and an output coupled to the oscillator for suppressing the output of the oscillator during a period when the regulator output rises above a predetermined value and releasing the stored energy at the end of such period with means for interrupting the clamp interval in accordance with demands of the power supply load to provide a forced power input interval and avoid high clamping current-resistance losses.

4. A direct-current power supply as described in claim 1 wherein the clamping circuit comprises transistor means for short circuiting an element of the oscillator responsive to the output of the alternating-current regulator.

5. A direct-current power supply as described in claim 1 wherein the alternating-current regulator comprises a differential amplifier with a non-inverting input coupled to the adjustable reference voltage means and an inverting input coupled to the output of the oscillator through a rectifier.

6. A direct-current power supply as described in claim 5 wherein the direct-current regulator comprises a differential amplifier with a non-inverting input coupled to the direct-current output terminals and an inverting input coupled to a constant-voltage source.

7. A direct-current power supply as described in claim 6 wherein the adjustable reference voltage means for the alternating-current regulator comprises a transistor circuit and the direct-current regulator has an output coupled to said transistor circuit.

8. A direct-current power supply as described in claim 2 wherein the blocking oscillator comprises an electronic valve, a pulse transformer having a primary winding connected in series with the electronic valve across the oscillator energy input terminals, a feedback winding and an output winding, the electronic valve having a control element coupled to the feedback winding of the pulse transformer and the output winding of the pulse transformer is coupled to the direct-current output terminals through said rectifying means.

9. A direct-current power supply as described in claim 8 wherein the pulse transformer has a tertiary winding, an electronic valve is connected across the tertiary winding having a control element and the control element is coupled to the clamping circuit for shorting out the tertiary winding when the output of the clamping circuit has a given relation and opening the circuit of the tertiary winding when the output of the clamping circuit has the opposite relation.

10. An alternating-current to direct-current converter comprising a direct-current power supply as described in claim 1 wherein alternating-current input terminals are provided and a rectifier is interposed between the alternating-current input terminals and the oscillator energizing input terminals.

11. A converter as described in claim 10 wherein the blocking oscillator is designed for a free-running frequency which is relatively high and the alternating-current input terminals are connected to a relatively low-frequency, alternating-current power source.

* * * * *